Patented Sept. 20, 1932

1,878,988

UNITED STATES PATENT OFFICE

SAMUEL E. SHEPPARD, OF ROCHESTER, NEW YORK, ASSIGNOR TO EASTMAN KODAK COMPANY, OF ROCHESTER, NEW YORK, A CORPORATION OF NEW YORK

PROCESS FOR THE MANUFACTURE OF CELLULOSE ACETATE

No Drawing.   Application filed July 15, 1929.   Serial No. 378,577.

This invention relates to a process for the manufacture of cellulose acetate and particularly to the use of hydrochloric acid as a catalyst therein.

In the manufacture of cellulose acetate by known processes it is customary to treat the cellulosic material either in the pretreated or unpretreated stage with acetic acid, acetic anhydride and a suitable catalyst at a temperature of approximately 40° C. until a cellulose tri-acetate is obtained. The catalysts which have been recommended for this purpose have been legion but it appears that those which are most successful are the mineral acid catalysts including, for example, sulfuric acid, phosphoric acid, etc.

Hydrochloric acid has been recommended in the past for this purpose as in British Patent 2026 B of 1907, in which the acetylating reaction is carried on in the usual acetylation solution containing an aqueous solution of hydrochloric acid. The quality of the cellulose acetate resulting from this reaction is not therein disclosed. It is well known, however, to those familiar with this art that such a reaction will produce a cellulose acetate, the molecule of which is considerably degraded, i. e. it is believed that such reactions break up the long cellulose molecule which results in a cellulose acetate having little or no value. This is readily evidenced in the films, which are formed by spreading a solution of the ester on a suitable surface, and evaporating therefrom the solvent, in that these films are exceedingly brittle. The viscosity of such acetates, when hydrolized to acetone solubility and dissolved in an acetone solution, is very low, which is another indication of their degradation.

The object of the present invention is to provide a method for the use of hydrochloric acid as a catalyst in the production of cellulose acetate whereby an undegraded cellulose acetate of a high degree of uniformity is obtained. Other objects will hereinafter appear.

I have found that by treating cellulose in a reaction mixture with hydrochloric acid and a suitable reducing substance that the above described deleterious action of this catalyst is greatly inhibited. In the presence of such a reducing substance in the reaction mixtures a uniform reaction takes place, the usual drastic effect of the hydrochloric acid which results when hydrochloric acid is used without my reducing substance being absent.

I have found good reasons to attribute the drastic action of the hydrochloric acid as a catalyst upon the oxidation products which result from an interaction of the acid with the water present, notably among these products is hypochlorous acid which is present in appreciable amounts in a solution of hydrochloric acid containing any moisture. This oxidation product of hydrochloric acid is readily formed by photochemically induced autoxidation which may be represented by the following formula:

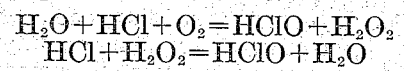

water thus being regenerated, but serving to establish a chain reaction. This, of course, is not essential to the carrying out of this invention but may more clearly bring out the reasoning by which the results herein obtained were arrived at, nor does this discussion preclude the possibility that higher oxidation products, as perchloric acid, are also found to some extent. There are several reactions which could be used as evidence of the undue oxidizing power of hydrochloric acid solution, of which one is the oxidation of colloidal silver to silver chloride, another the oxidation of sulfides and sulfuretted hydrogen.

To prevent the formation of these oxidation reactions in hydrochloric acid solutions and to confine its action primarily to its acidic function, I find it sufficient to add quite small quantities of certain reducing substances to the hydrochloric acid solution which buffer the solution against oxidation. The nature of these reducing agents, as they may be called, will, of course, be regulated by the type of solution in which they are to be used. I have found that the following substances are suitable for this purpose but it is generally easy to select numerous other suitable examples other than those hereinbelow specified. Sulfurous acid ($SO_2$), arsenious acid ($As_2O_3$), stannous oxide, antimonous oxide, hypophosphorous acid ($HPO_2$), may be mentioned as inorganic componds as buffers for this purpose while among the organic reducing substances which I have found suitable for use in various solutions are mannose, lactose, glucose, phenol, polyphenols, hydroquinone, amino-phenols and particularly those with ortho and para linkages.

Particularly suitable for use in the treatment of cellulose I have found sulfurous acid and hydrosulfurous acids. These acids in conjunction with the hydrochloric acid may be used in the pretreatment of the cellulose prior to the acetylation in, for example, an acetic acid solution. In the acetylating solutions containing acetic anhydride and hydrochloric acid as a catalyst, it has been found suitable for the prevention of the degradation of the cellulose molecule whatever may be the cause of this action of the hydrochloric acid when used alone. In hydrolyzing mixtures, for the deacetylation of the cellulose acetate to an acetate having the desired solubility, consisting of acetic acid, water and hydrochloric acid it is likewise suitable. The small amounts of sulfuric acid which are eventually formed by the oxidation of the sulfurous acid are much less powerful than the oxidizing side products resulting from the hydrochloric acid.

It is, of course, understood that the above example of the use of sulfurous acid is merely indicative of other reducing agents which may be used in any of the well-known types of acetylating reaction mixtures in which hydrochloric acid may be used as a catalyst; it being borne in mind that the reducing substance used must be compatible with the ingredients of the solution and in no way break down the other ingredients therein.

Under the usual acetylating conditions it is advisable to use in the order of 1/100 per cent to 5 per cent of the hydrochloric acid present of a reducer. This amount surprisingly reduces the drastic action of the hydrochloric acid catalyst and thereby allows the reaction to proceed more uniformly whereby an undegraded product is obtained having an exceptionally high quality. This is shown by a lower copper reducing power of the cellulosic products and a much less reduction in viscosity for equal times of reaction and also solutions coated from a hydrolyzed solution of the acetate result in films having a good degree of flexibility.

Various equivalents may be used as a reducing substance to buffer the autoxidation of the hydrochloric acid without in any way departing from his invention or sacrificing any of the advantages derived therefrom. These reducing substances may likewise be used in all the types of acetylating mixtures in common use in which the acidic action of the hydrochloric acid is more desirable than its oxidizing action and likewise when it is desirable to inhibit the drastic attack on the cellulose molecule by the untreated hydrochloric acid catalyst.

Having thus described my invention, what I claim as new and desire to secure by Letters Patent is:

1. The process for the manufacture of organic esters of cellulose which comprises conducting the reaction in a liquid bath containing hydrochloric acid and a reducing substance which buffers the hydrochloric acid against autoxidation.

2. The process for the manufacture of organic esters of cellulose which comprises acylating cellulose in a liquid bath containing hyrochloric acid and a reducing substance which buffers the hydrochloric acid against autoxidation.

3. The process for the manufacture of cellulose acetate which comprises acetylating cellulose in a liquid bath containing hydrochloric acid and a reducing substance which buffers the hydrochloric acid against autoxidation.

4. The process for the manufacture of cellulose acetate which comprises acetylating cellulose in a liquid bath containing hydrochloric acid and 1/100% to 5% of sulphurous acid based upon the hydrochloric acid present.

5. The process for the manufacture of organic esters of cellulose which comprises conducting the reaction in a liquid bath containing hydrochloric acid and 1/100 to 5% of a reducing substance based upon the hydrochloric acid present.

6. The process for the manufacture of organic esters of cellulose which comprises acylating cellulose in a liquid bath containing hydrochloric acid and 1/100 to 5% of a reducing substance based upon the hydrochloric acid present.

7. The process for the manufacture of organic esters of cellulose which comprises reacting on cellulose with a liquid bath containing hydrochloric acid as a catalyst and a reducing substance which buffers the hydrochloric acid against autoxidation.

8. The process for the manufacture of cellulose acetate which comprises pre-treating, acylating and hydrolyzing cellulose in liquid baths containing hydrochloric acid and a reducing substance which buffers the hydrochloric acid against autoxidation.

9. A process for the manufacture of cellulose acetate which comprises acetylating cellulose in a bath containing hydrochloric acid and 1/100% to 5% of hydroquinone based upon the hydrochloric acid present.

Signed at Rochester, New York, this 8th day of July, 1929.

SAMUEL E. SHEPPARD.